(12) United States Patent
Kang et al.

(10) Patent No.: US 9,478,055 B2
(45) Date of Patent: Oct. 25, 2016

(54) DEVICE AND METHOD FOR EDITING INK TEXT DATA

(71) Applicant: DIOTEK CO., LTD., Seoul (KR)

(72) Inventors: Jaewoo Kang, Suwon-Si (KR); Jongwon Shin, Gwangmyeong-si (KR)

(73) Assignee: DIOTEK CO., LTD., Seoul (KR)

( * ) Notice: Subject to any disclaimer, the term of this patent is extended or adjusted under 35 U.S.C. 154(b) by 124 days.

(21) Appl. No.: 14/244,881

(22) Filed: Apr. 3, 2014

(65) Prior Publication Data
US 2014/0300609 A1    Oct. 9, 2014

(30) Foreign Application Priority Data

Apr. 4, 2013    (KR) .................. 10-2013-0036594

(51) Int. Cl.
| | | |
|---|---|---|
| *G06T 11/60* | (2006.01) | |
| *G06F 3/0488* | (2013.01) | |
| *G06F 17/24* | (2006.01) | |

(52) U.S. Cl.
CPC ........... *G06T 11/60* (2013.01); *G06F 3/04883* (2013.01); *G06F 17/242* (2013.01)

(58) Field of Classification Search
CPC ...................................................... G06T 11/60
USPC ........................................................ 345/467
See application file for complete search history.

(56) References Cited

U.S. PATENT DOCUMENTS

| | | | | |
|---|---|---|---|---|
| 5,347,295 A | * | 9/1994 | Agulnick | G06F 1/1626 345/156 |
| 5,367,453 A | * | 11/1994 | Capps | G06F 17/273 345/179 |
| 5,404,439 A | * | 4/1995 | Moran | G06T 11/00 345/642 |
| 5,592,608 A | * | 1/1997 | Weber | G06F 17/30259 707/E17.024 |
| 5,664,209 A | * | 9/1997 | Ueda | G06F 17/2264 715/210 |
| 5,862,256 A | * | 1/1999 | Zetts | G06K 9/00416 382/187 |
| 5,864,635 A | | 1/1999 | Zetts et al. | |
| 5,880,743 A | * | 3/1999 | Moran | G06T 13/80 345/473 |

(Continued)

FOREIGN PATENT DOCUMENTS

EP    1435568 A2    7/2004

OTHER PUBLICATIONS

Extended European Search Report for application No. 14159391.3 dated Oct. 6, 2015.

*Primary Examiner* — Javid A Amini
(74) *Attorney, Agent, or Firm* — Hauptman Ham, LLP

(57) ABSTRACT

Disclosed are a device and method for editing ink text data. More specifically, a device for editing digital ink data displayed on a display includes a stroke order rearrangement processing unit configured to rearrange an input order of two or more strokes on the basis of a predefined criterion to generate a rearranged input order when receiving a user input including the two or more strokes, a data generation unit configured to generate digital ink data corresponding to a rearrangement stroke reflecting the rearranged input order, and an editing unit configured to change the digital ink data displayed on the display when an editing signal is generated. Thus, a user can intuitively and easily perform the editing operation, such as update, deletion, and insertion, on digital ink data displayed on a screen, and thus feel satisfaction.

14 Claims, 14 Drawing Sheets

(56) References Cited

U.S. PATENT DOCUMENTS

| | | | |
|---|---|---|---|
| 6,459,442 B1 * | 10/2002 | Edwards | G06F 3/04883 715/700 |
| 6,509,912 B1 * | 1/2003 | Moran | G06F 3/04883 715/762 |
| 6,525,749 B1 * | 2/2003 | Moran | G06F 17/24 345/156 |
| 6,909,439 B1 * | 6/2005 | Amro | G06F 3/04855 345/660 |
| 6,952,803 B1 * | 10/2005 | Bloomberg | G06F 17/211 382/186 |
| 7,257,528 B1 * | 8/2007 | Ritchie | G06F 3/0236 341/28 |
| 2003/0142106 A1 * | 7/2003 | Saund | G06K 9/00463 345/582 |
| 2003/0142112 A1 * | 7/2003 | Saund | G06K 9/00463 345/619 |
| 2003/0214531 A1 * | 11/2003 | Chambers | G06F 3/04883 715/764 |
| 2005/0041866 A1 | 2/2005 | Silverman et al. | |
| 2008/0215307 A1 * | 9/2008 | Li | G06F 17/2863 704/3 |
| 2011/0115715 A1 * | 5/2011 | Li | G06F 3/018 345/171 |

* cited by examiner

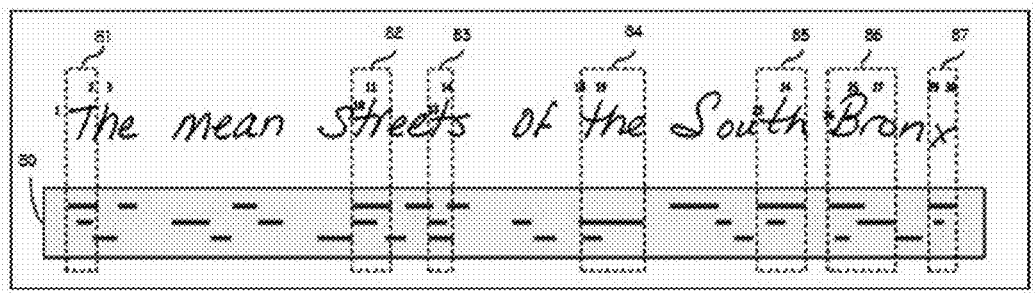
FIG. 8a
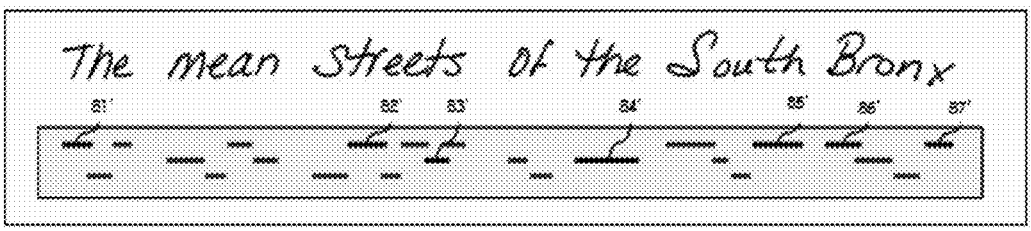
FIG. 8b
FIG. 8c
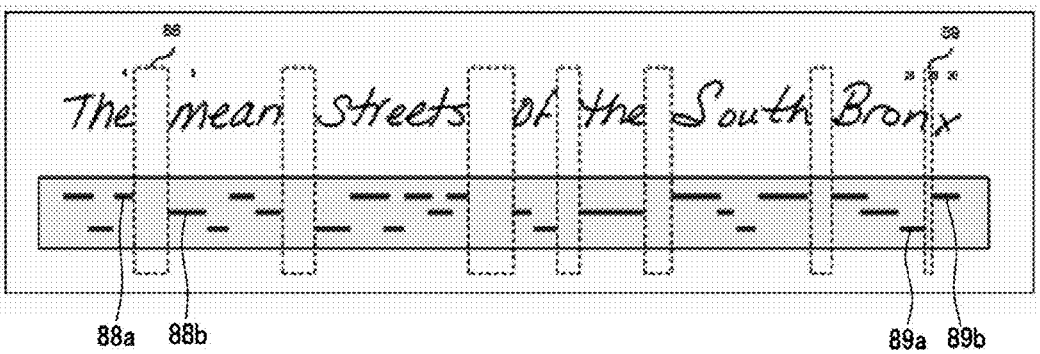
FIG. 8d

DEVICE AND METHOD FOR EDITING INK TEXT DATA

CROSS-REFERENCE TO RELATED APPLICATION

This application claims priority to and the benefit of Korean Patent Application No. 2013-0036594, filed on Apr. 4, 2013, the disclosure of which is incorporated herein by reference in its entirety.

BACKGROUND

1. Field of the Invention

The present invention relates to a device and method for editing ink text data, and more particularly, to a device and method for editing ink text data including at least one of digital ink data and text data which are displayed on a screen of a display.

2. Discussion of Related Art

Recently, due to the rapid and global increase in the number of users of mobile terminals such as smartphones, much research has been conducted on a technology for inputting characters and editing the input characters in a manner in which a display screen of a mobile terminal is directly touched.

U.S. Patent Publication No. 2003/0214531, entitled "Ink Input Mechanisms," discloses a technology of inputting characters into an input region and an enlarged input region which is formed by enlarging the input region, with digital ink. In particular, the patent document discloses a technology of giving attributes such as Color, Bold, Underline, Italic, Subscript, Align, etc. to digital ink data displayed on a screen of a display.

FIG. 1 is a view illustrating digital ink data displayed on a screen of a conventional character input device, which is disclosed in U.S. Patent Publication No. 2003/0214531. "a" portion (conceived in liberty) of the digital ink data displayed on a screen 12 by a digital ink editor of the character input device 10 has been modified to Italic, and "b" portion thereof (created equal) has increased in size. Also, "c" portion (brought forth~to the proposition) of the digital ink data displayed on the screen 12 by the digital ink editor has been converted to text data using character recognition technology.

However, there is a limitation in that a user cannot freely edit digital ink data displayed on a display screen at his/her disposal.

SUMMARY OF THE INVENTION

It is therefore an object of the present invention to solve the problems of prior arts and some embodiments of the present invention provide a device and method for editing data, which may edit digital ink data in an editing manner similar to that of the text data in an environment where text data input in a text input mode is mixed with digital ink data input in a digital ink input mode.

Some embodiments of the present invention also provide a device and method for intuitively and conveniently editing digital ink data in a user interface environment provided similarly to the text editing manner, in order to easily perform an editing operation, such as insertion, deletion, and update, on digital ink data displayed on a screen.

However, the technical objects of the invention are not limited to the aforesaid ones.

According to an aspect of the present invention, there is provided a device for editing digital ink data displayed on a display, including a stroke order rearrangement processing unit configured to rearrange an input order of two or more strokes on the basis of a predefined criterion to generate a rearranged input order when receiving a user input including the two or more strokes, a data generation unit configured to generate digital ink data corresponding to a rearrangement stroke reflecting the rearranged input order, and an editing unit configured to change the digital ink data displayed on the display when an editing signal is generated.

The stroke order rearrangement processing unit may rearrange the input order of the two or more strokes on the basis of a distance between an input position for the two or more strokes and a virtual reference line predetermined in a region input in a digital ink input mode.

The two or more strokes may be two or more strokes input until a last stroke was input if no additional input has been received for a predetermined time since the last stroke was input, two or more strokes input before a selection signal for selecting a predetermined button is generated, or two or more strokes input before a stroke crossing a virtual threshold line predetermined in a region input in a digital ink input mode is generated.

When an overlapped length between overlapped stroke segments among stroke segments formed by projecting the rearrangement stroke onto a first virtual axis is equal to or greater than a predetermined first reference value, the data generation unit may include a block processing unit configured to process, as one stroke block, a plurality of strokes corresponding to the overlapped stroke segments and generate digital ink data corresponding to the stroke block.

When a distance between two adjacent stroke segments among stroke segments formed by projecting the stroke block onto a first virtual axis is equal to or greater than a predetermined second reference value, the data generation unit may generate ink space data between the stroke block corresponding to the two stroke segments, and the editing unit may change the ink space data displayed on the display when the editing signal is generated.

When a distance between two adjacent stroke segments among stroke segments formed by projecting the rearrangement stroke onto the first virtual axis is equal to or greater than a predetermined second reference value, the data generation unit may generate ink space data between the rearrangement stroke corresponding to the two stroke segments, and the editing unit may change the ink space data when the editing signal is generated.

The data generation unit may generate text data corresponding to an input signal generated by a text input mode, and the editing unit may change the text data displayed on the display when the editing signal is generated.

The digital ink data and the text data may be displayed in a space between a plurality of virtual lines along the plurality of virtual lines.

The digital ink data and the text data may have the same data structure.

The device may further include a cursor position determination unit configured to determine a position of a cursor displayed on the display, in which the editing unit may change the digital ink data displayed on the display on the basis of the position of the cursor at the time when the editing signal is generated.

The cursor position determination unit may include a sensing unit configured to sense a position of a touch signal generated by a user's touch, and an analysis unit configured to determine data crossing a virtual axis formed on the basis of the position of the touch signal among the digital ink data, and determine the position of the cursor on the basis of a determination result of the analysis unit.

The editing signal may include an insertion signal for inserting additional digital ink data into the digital ink data, a deletion signal for deleting at least a portion of the digital ink data, or an update signal generated when an additional input is applied while the at least a portion of the digital ink data is selected.

According to another aspect of the present invention, there is provided a method of editing digital ink data displayed on a display, including rearranging an input order of two or more strokes on the basis of a predefined criterion to generate a rearranged input order when receiving a user input including the two or more strokes, generating digital ink data corresponding to a rearrangement stroke reflecting the rearranged input order, and changing the digital ink data displayed on the display when an editing signal is generated.

The generating of the rearranged input order may include rearranging the input order of the two or more strokes on the basis of a distance between an input position for the two or more strokes and a virtual reference line predetermined in an input region for a digital ink input mode.

The two or more strokes may be two or more strokes input until a last stroke was input if no additional input has been received for a predetermined time since the last stroke was input, two or more strokes input before a selection signal for selecting a predetermined button is generated, or two or more strokes input before a stroke crossing a virtual threshold line predetermined in a region input in a digital ink input mode is generated.

When an overlapped length between overlapped stroke segments among stroke segments formed by projecting the rearrangement stroke onto a first virtual axis is greater than a predetermined first reference value, the generating of the digital ink data may include processing, as one stroke block, a plurality of strokes corresponding to the overlapped stroke segments and generating digital ink data corresponding to the stroke block.

When a distance between two adjacent stroke segments among stroke segments formed by projecting the stroke block onto a first virtual axis is equal to or greater than a predetermined second reference value, the generating may include generating ink space data between the stroke block corresponding to the two stroke segments, and the editing may include changing the ink space data displayed on the display when the editing signal is generated.

When a distance between two adjacent stroke segments among stroke segments formed by projecting the rearrangement stroke onto the first virtual axis is equal to or greater than a predetermined second reference value, the generating of the digital ink data may include generating ink space data between the rearrangement stroke corresponding to the two stroke segments, and the editing may include changing the ink space data when the editing signal is generated.

According to still another aspect of the present invention, there is provided a computer-readable recording medium storing an instruction set, in which when executed by a computing device, the instruction set may allow the computing device to rearrange an input order of two or more strokes on the basis of a predefined criterion to generate a rearranged input order when receiving a user input including the two or more strokes, generate digital ink data corresponding to a rearrangement stroke reflecting the rearranged input order, and change and edit the digital ink data displayed on the display when an editing signal is generated.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIGS. 8a to 8d are views illustrating a process in which digital ink data is generated by a data generation unit shown in FIG. 2, according to another example;

DETAILED DESCRIPTION OF EXEMPLARY EMBODIMENTS

Figure 1:
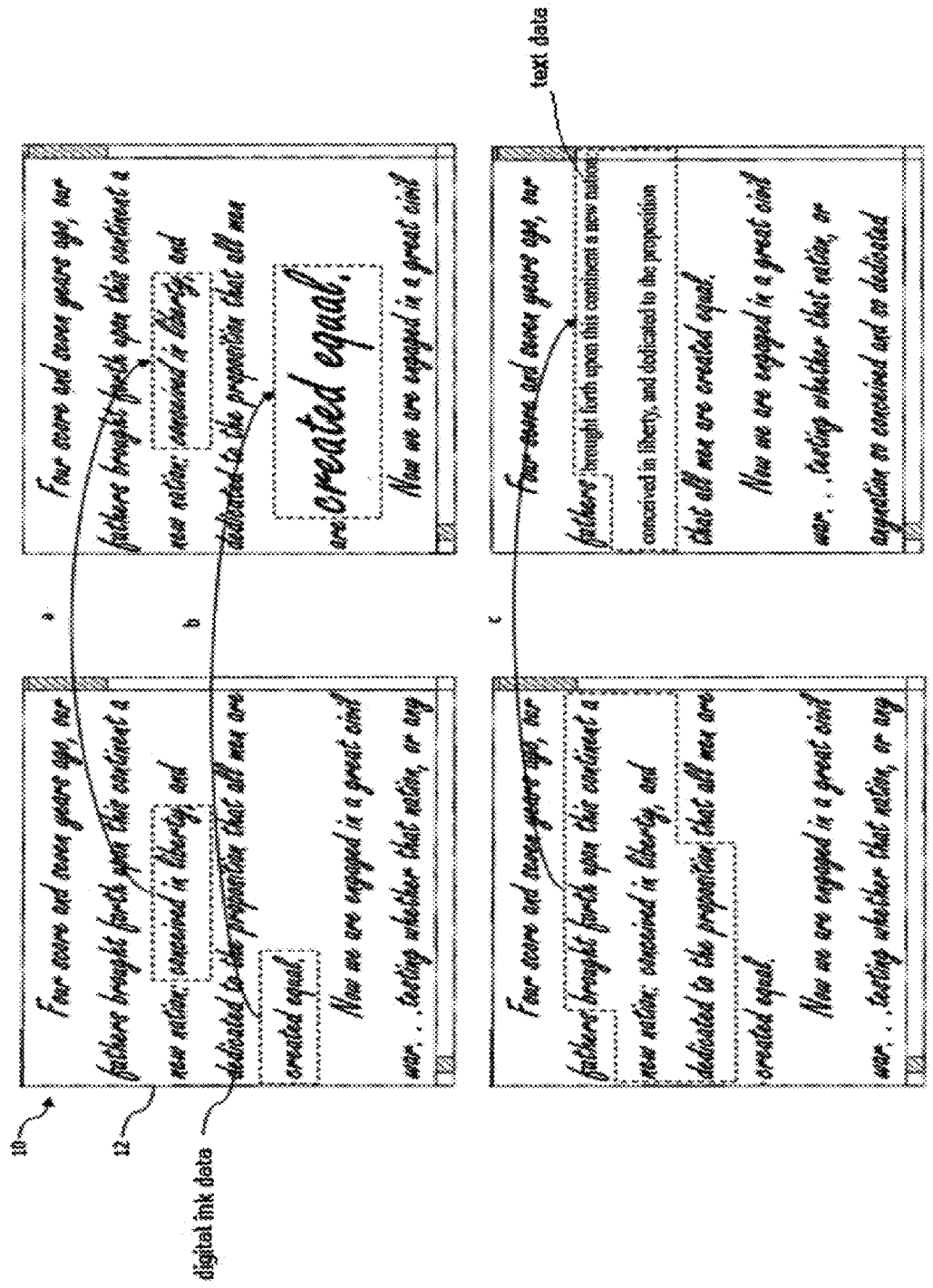
FIG. 1 is a view illustrating digital ink data displayed on a screen of a conventional character input device.

Hereinafter, preferred embodiments of the present invention will be described in detail with reference to the accompanying drawings such that a person skilled in the art may easily carry out the embodiments of the present invention. The present disclosure may, however, be embodied in different forms and should not be construed as limited to the embodiments set forth herein. In the drawings, anything unnecessary for describing the present disclosure will be omitted for clarity, and also like reference numerals in the drawings denote like elements.

In this disclosure below, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when it is described that one comprises (or includes or has) some elements, it should be understood that it may comprise (or include or have) only those elements or it may comprise (or include or have) other elements as well as those elements if there is no specific limitation.

In the specification, it will be understood that when one member is referred to as being "on" another member, it can be directly on the other member, or an intervening member may also be present.

Furthermore, when it is described that one comprises (or includes or has) some elements, it should be understood that it may comprise (or include or have) only those elements, or it may comprise (or include or have) other elements as well as those elements if there is no specific limitation. Also, the term "step of" does not mean "step for".

The terms used throughout the specification are defined as follows, prior to detailed description of the data editor proposed by the present invention.

Digital ink data is generated during a handwriting process, and is generated on the basis of the strokes input in a digital ink input mode such as a stylus pen.

The stroke is composed of a set of points. For example, suppose that a user inputs a character or figure to a digitizer with a stylus pen. In this case, one stroke may be a set of points that are aligned along a movement path of a pen sequentially from a time point when the pen contacts the digitizer to a time point when the pen releases the digitizer.

The point is information for defining coordinates in a space. For example, a point on the digitizer is represented as an x, y coordinate value in the space that may be represented by the digitizer. At this point, the coordinate value of the point may be represented as an absolute coordinate system in which the coordinate value on the digitizer is used with no change, or a relative coordinate system in which a specific reference point is set as an origin point.

A rearrangement stroke is a stroke in which a result of the rearrangement operation for rearranging a stroke input order is reflected.

A stroke segment is a segment having two ends, which are a maximum value and a minimum value among values on an x-axis, when points forming a certain stroke are projected onto a virtual x-axis (one-dimensional space).

The stroke block is a set composed of two or more strokes.

A predetermined first reference value denotes a reference length for determining how much the stroke segments (or stroke block segments) are overlapped or piled up, and the reference length may be variable with cases.

A predetermined second reference value denotes a reference distance for determining how far the stroke segments (or stroke block segments) are spaced apart.

Text data is generated on the basis of character codes such as ASCII, which is input in a text input mode such as a keyboard.

Ink space data may be generated between a neighboring stroke and stroke block, between neighboring strokes, and between adjacent stroke blocks only when a condition related to the predetermined second reference value is satisfied. For example, a first x coordinate value is calculated at the leftmost one of multiple points composing a certain stroke segment. Then, a second x coordinate value is calculated at the rightmost one of multiple points composing a stroke segment positioned closest to the first x coordinate value. If the difference between the two x coordinate values is greater than or equal to the predetermined second reference value, the ink space data may be generated. If the difference is less than the predetermined second reference value, the ink space data may not be generated.

Ink text data denotes mixed data including the digital ink data, text data, and ink space data. The ink text data may include only either the text data or the digital ink data. In general, the ink text data may be stored in a markup language such as a binary format or XML.

A data editor provides functions of displaying, editing, and storing the ink text data.

Each component and operation of the data editor proposed by the present invention will be described in detail below with reference to FIG. 2.

Figure 2:
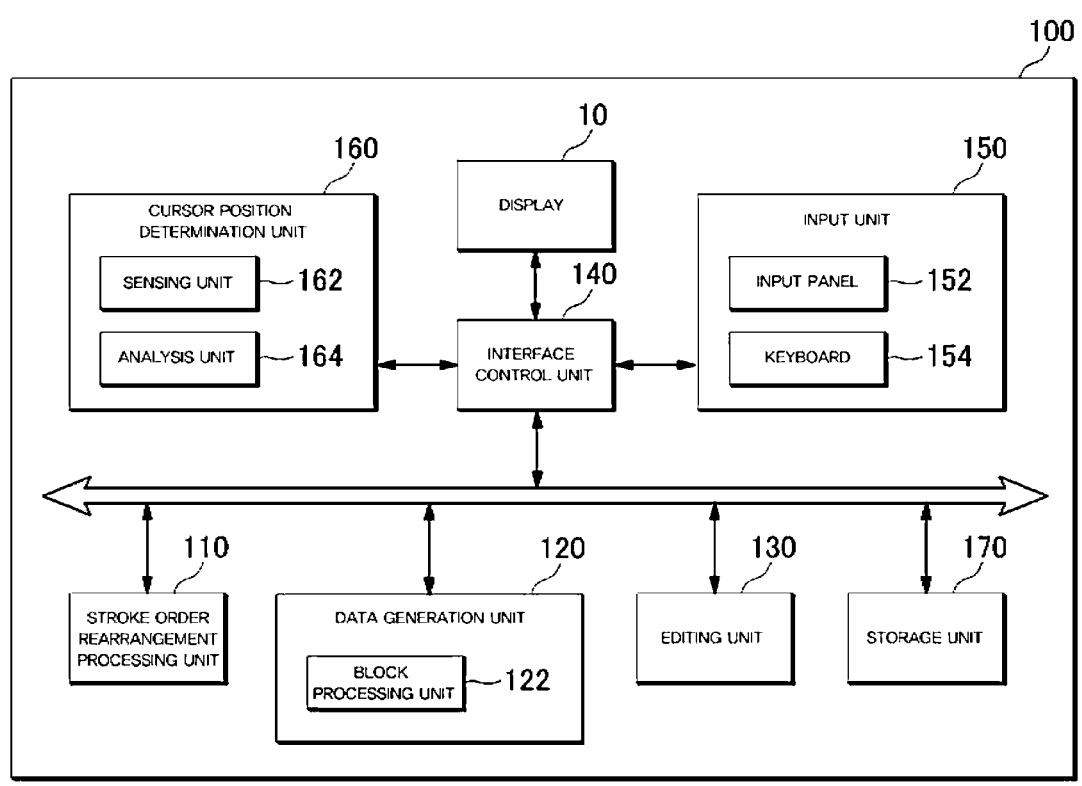
FIG. 2 is a block diagram showing a configuration of a data editor according to an embodiment of the present invention.

FIG. 2 is a block diagram showing each component of a data editor according to an embodiment of the present invention. The data editor 100 may be implemented as a various type of a mobile terminal or computer. Here, the mobile terminal is, for example, a wireless communication device having portability and mobility, which may include all kinds of handheld wireless communication devices such as Personal Communication System (PCS), Global System for Mobile communications (GSM), Personal Digital Cellular (PDC), Personal Handyphone System (PHS), Personal Digital Assistant (PDA), International Mobile Telecommunication (IMT) 2000, Code Division Multiple Access (CDMA) 2000, W-Code Division Multiple Access (W-CDMA), Wireless Broadband Internet (WiBro) terminals and smartphones. Also, the computer may include, for example, a notebook, desktop, laptop, tablet PC, slate PC, etc. with a web browser.

The data editor 100 according to an embodiment of the present invention includes a display 10, a stroke order rearrangement processing unit 110, a data generation unit 120, an editing unit 130, an interface control unit 140, an input unit 150, a cursor position determination unit 160, and a storage unit 170.

The display 10 displays a variety of data including digital ink data, ink space data, and text data on a screen. A user may confirm his/her input data through the display 10. Furthermore, the display 10 may vary in, but is not limited to, a size, shape, performance, or driving manner depending on the type of the data editor 100.

Figure 3:
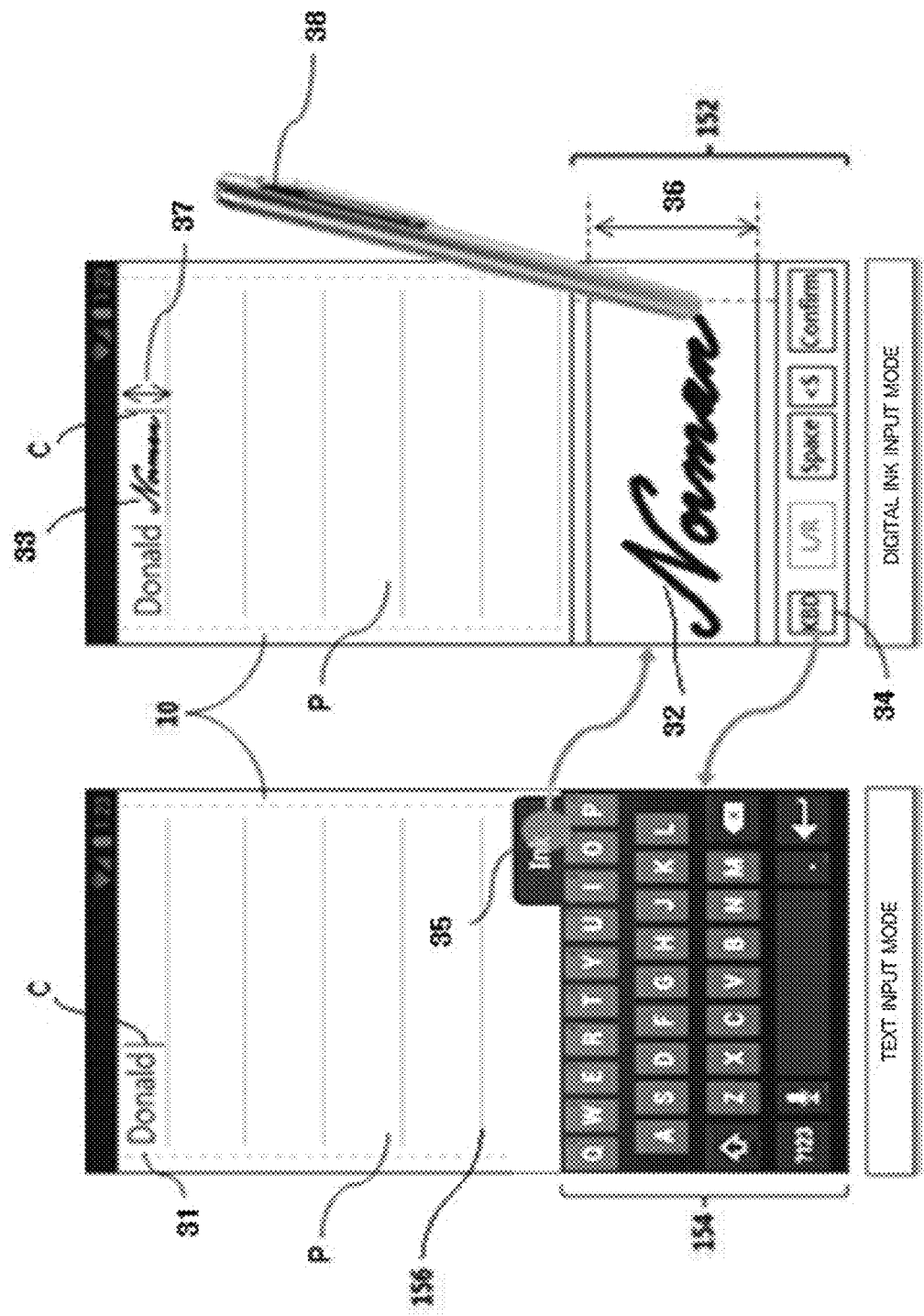
FIG. 3 is a view illustrating a user interface including a display panel, an input panel, and a keyboard according to an example.

Also, the display 10 itself may receive data in a touch manner as well as display a variety of data. That is, an input panel 152 and a keyboard 154 included in the input unit 150 may be displayed on a screen of the display 10 as shown in FIG. 3, on the basis of a control signal of the interface control unit 140. FIG. 3 is a view illustrating a user interface including a display panel, an input panel, and a keyboard according to an example.

The user interface may include a display panel P for displaying at least one of the digital ink data, text data, and ink space data, an input panel 152 supporting the digital ink input mode, and a keyboard 154 supporting the text input mode. However, the input unit 150 including the input panel 152 or keyboard 154 may be implemented as a separate input device connected with the data editor 100, which is separated from the display panel P.

FIG. 3 illustrates the keyboard 154 supporting the text input mode and the display panel P on the left side and the input panel 152 supporting the digital ink input mode and the display panel P on the right side. In FIG. 3, text data 31, "Donald," is displayed on the display panel P on the left side, and digital ink data 33, "Normen," is displayed on the display panel P immediately after the text data 31 on the right side. That is, the text data 31 and the digital ink data 33 may be displayed in series along a plurality of virtual lines 156. A cursor C positioned after the text data 31 gradually moves to the right direction as the digital ink data 33 is newly displayed. In particular, the digital ink data 33 may be generated on the basis of a stroke 32 input on the input panel 152 with a stylus 38, and displayed on the display panel P.

Also, the input panel 152 may have a design different from FIG. 3, and the keyboard 154 may have buttons disposed in a variety of patterns or combinations known in the art. A first switch button 34 for switching the digital ink input mode into the text input mode and a second switch button 35 for switching the text input mode into the digital ink input mode may be displayed on the screen of the display 10.

In this case, a height length 36 of the input panel 152 and a space 37 of the virtual line 156 may be matched with each other. The size of the digital ink data 33 may be reduced by a ratio shown in Equation (1) in order to be displayed along the virtual line 156 within the space 37.

Reduction ratio=(space between virtual lines)/(height length of input panel)        (1)

However, the reduction ration is not limited to Equation (1) and may be determined on the basis of another value.

Figure 4:
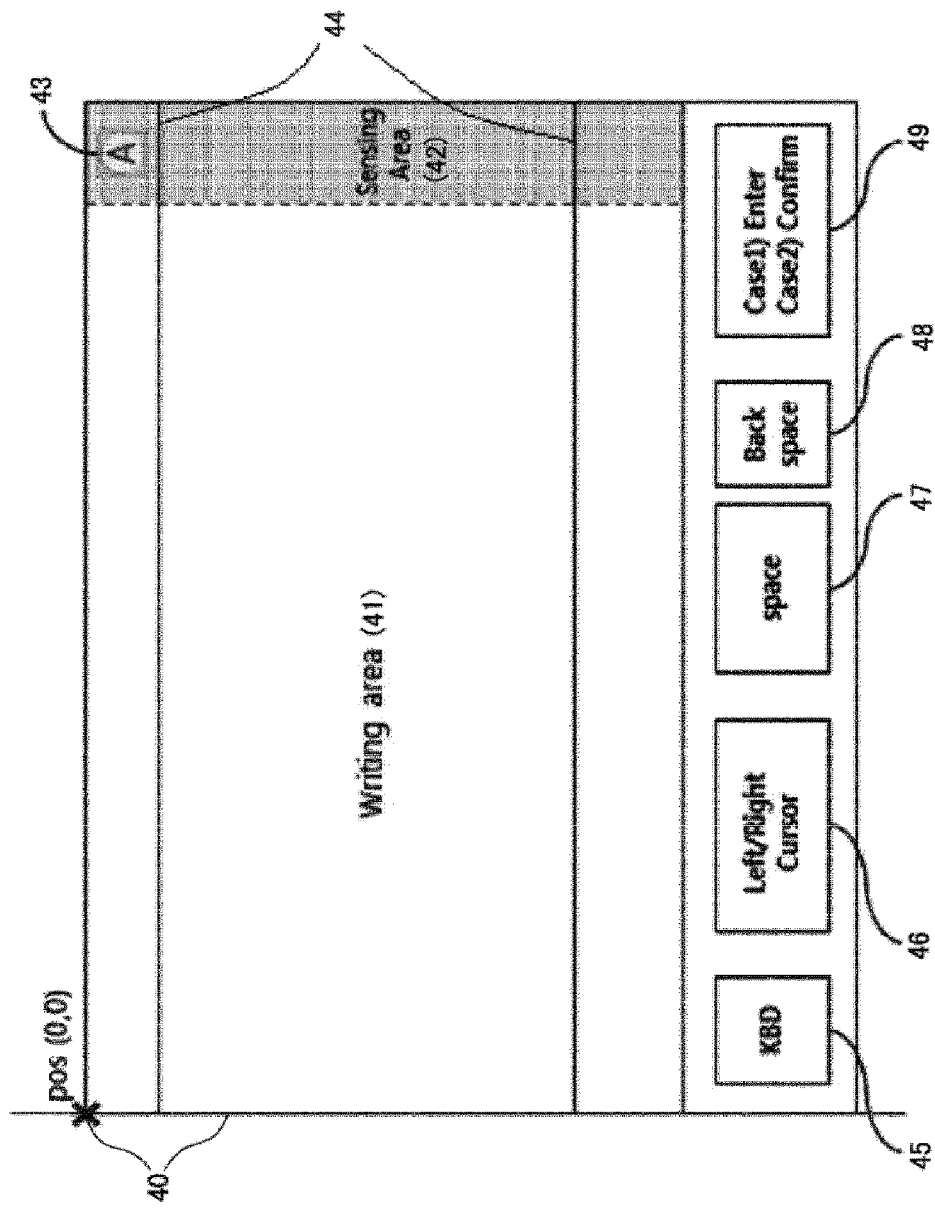
FIG. 4 is a view for describing in detail an input panel capable of supporting a digital ink input mode shown in FIG. 3.

The input panel 152 will be described in detail below with reference to FIG. 4. FIG. 4 is a view for describing in detail the input panel capable of supporting the digital ink input mode shown in FIG. 3.

The input panel 152 may include a handwriting region 41 where writing is substantially performed in the digital ink input mode, a sensing region 42, and a button region. However, the present invention is not limited to the arrangement or size of each region.

A predetermined virtual reference line or virtual reference point 40 may be disposed at the left or right end of the handwriting region 41, and may have a close relation with the rearrangement operation to be described below.

In FIG. 4, the sensing region 42 is disposed at the right side of the handwriting region 41 in consideration of a typical writing direction. However, the sensing region 42 may be disposed at the left side. The sensing region 42 may include a predetermined virtual threshold line, which has a close relation with the rearrangement operation to be described below. Button A (43) may be a button for determining a setting value related to the digital ink input mode. The setting value related to the digital ink input mode may include, for example, a central line adjustment value for helping parallel handwriting, a guide line 44 adjustment value for setting top and bottom boundaries of an input permissible region, a setting value about resizing or reduction ratio, and a setting value about thickness or color of a stroke displayed on the handwriting region 41.

Also, the button region may include a plurality of buttons as shown in FIG. 4, and may be disposed at the bottom of the input panel 152. The buttons disposed in a line in the button region may include a switch button 45 for switching the input mode from the digital ink input mode to the text input mode, an edit button 46 used for left and right movement of a curser to be described below or used for clear operation/undo operation/redo operation, a space button 47, a backspace/delete button 48, and an enter/confirm button 49. However, the dispositions and operations of the plurality of buttons may be varied and is not limited as shown in FIG. 4. In addition, the editing operation performed similarly to the text data on the basis of an editing signal generated for digital ink data displayed on a screen through these buttons will be described in detail below.

Figure 5:
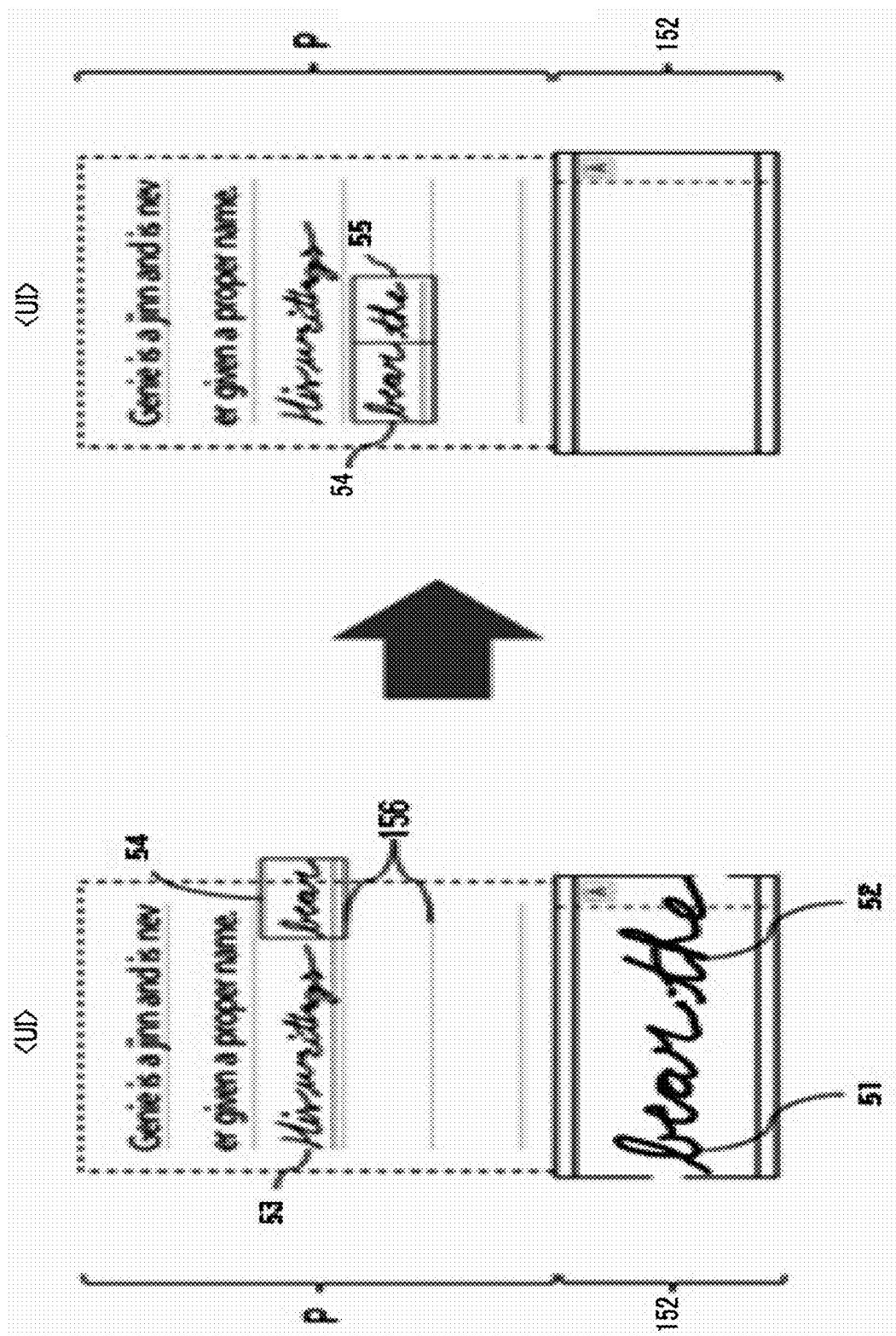
FIG. 5 is a view illustrating an example of performing the digital ink input shown in FIG. 3.

Furthermore, FIG. 5 is a view illustrating an example of performing an input in the digital ink input mode shown in FIG. 3. Auto line change may be performed on digital ink data like in case of text data.

Specifically, two lines of text data and one line of digital ink data 53 is already displayed on the display panel P along the virtual line 156. In this case, a first input 51 and a second input 52 is additionally input on the input panel 152 in the digital ink input mode. There is no space in a third line sufficient to display digital ink data 54 corresponding to the first input 51. Thus, digital ink data 55 corresponding to the second input 52 in addition to the display digital ink data 54 corresponding to the first input 51 is moved to and displayed in a fourth line. Now, a process of displaying digital ink data on a screen and editing the digital ink data similarly to the text data will be described in detail below.

Returning back to FIG. 2, each component included in the data editor 100 according to an embodiment of the present invention will be described.

The stroke order rearrangement processing unit 110 performs a rearrangement operation for rearranging a stroke input order such that one or more strokes input in the digital ink input mode may be processed according to the actual input position. That is, the stroke order rearrangement processing unit 110 may rearrange the stroke input order such that the stroke may be processed according to the input position.

Figure 6:
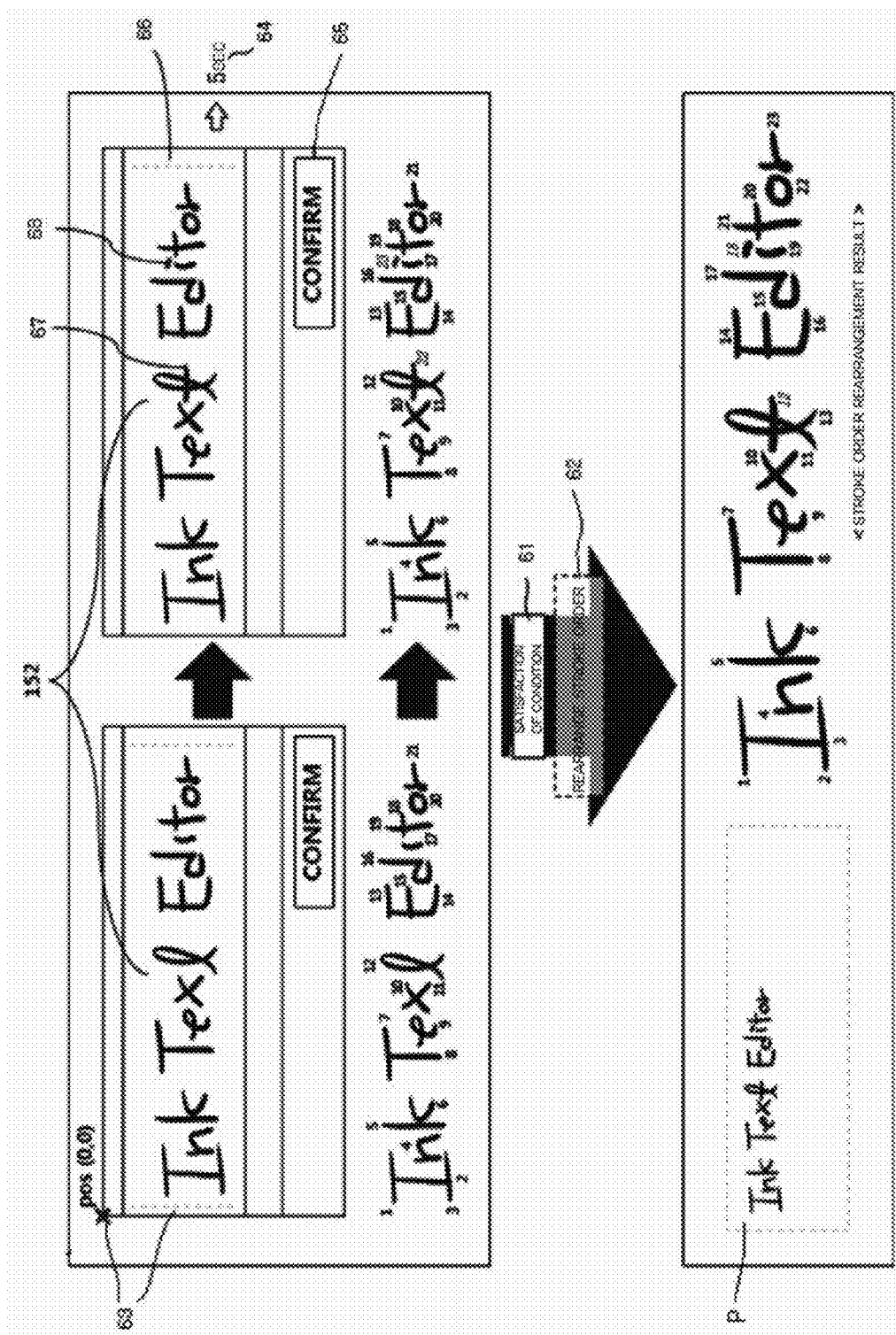
FIG. 6 is a view illustrating a rearrangement operation performed by a stroke order rearrangement processing unit shown in FIG. 2 according to an example.

In this case, the stroke may be input in any position and order in the digital ink input mode unlike the text input mode. Accordingly, in order to effectively and conveniently editing digital ink data generated on the basis of the stroke, the digital ink data needs to be separately processed before displayed on a screen, which will be described with reference to FIG. 6. FIG. 6 is a view illustrating a rearrangement operation performed by the stroke order rearrangement processing unit shown in FIG. 2 according to an example.

In FIG. 6, a stroke "-" 67 for completing alphabet "t" and a stroke "•" 68 for completing alphabet "i" are a 22nd input stroke and 23rd input stroke, that is the last two input strokes, respectively. However, the input position of these strokes is in the middle of all strokes. Thus, the data editor 100 can not predict input time or input position. If another user inputs "Ink Text Editor," the strokes may not be input in the same order as in FIG. 6. That is, the digital ink input mode is characterized in that the input cannot be predicted due to its high degree of freedom.

Accordingly, the stroke order rearrangement processing unit 110 performs a stroke order rearrangement operation for rearranging a stroke input order according to a certain criteria, such that digital ink data displayed on a screen may be consistently edited. Also, the stroke order rearrangement processing unit 110 may perform the rearrangement operation on the basis of the distance between the stroke input position and the virtual reference point or virtual reference line 63 predetermined in an input region 152 for the digital ink input mode.

In FIG. 6, when a certain condition is satisfied (61), the stroke order rearrangement processing unit 110 performs a rearrangement operation 62 for rearranging the input order. Thus, the stroke "-" 67 for completing alphabet "t" and a stroke "•" 68 for completing alphabet "i" are processed as if input at the 12th time and 18th time. These strokes are referred to as rearrangement strokes. That is, the stroke order rearrangement processing unit 110 may exactly manage and search for the stroke input order instead of the actual input order, on the basis of the distance between the actual stroke input position and the predetermined virtual reference line 63. For example, the length from the predetermined virtual reference line to the stroke may be defined as the average of the length from the predetermined virtual reference line to the maximum value of the stroke segment of the stroke and the length from the predetermined virtual reference line to the minimum value of the stroke segment of the stroke. In this case, it will be easily understood that a number indicating the rearrangement operation 62 or the processing result is not displayed on the display panel P, and only the digital ink data is displayed on the display panel P.

In particular, according to an example associated with a certain condition for starting the stroke order rearrangement operation 62, the stroke order rearrangement processing unit 110 may perform the rearrangement operation 62 on the strokes that has been input in a predetermined time of 5 seconds, which is a predetermined time 64, when there is no further input for the 5 seconds. According to another example, the stroke order rearrangement processing unit 110 may perform the rearrangement operation 62 on the strokes that has been input before a selection signal for selecting a "confirm 65" button is generated, which is a predetermined button for the rearrangement operation 62. According to still another example, the stroke order rearrangement processing unit 110 may perform the rearrangement operation 62 on the strokes that has been input before a stroke crossing a predetermined virtual threshold line 66 in the input region 152 for the digital ink input mode is generated. Alternatively, the rearrangement operation 62 may be performed in another method under a well known condition.

The data generation unit 120 generates digital ink data that corresponds to the rearrangement stroke reflecting a result of the rearrangement operation, which is displayed on a screen of the display 10. That is, the stroke input in the digital ink input mode may be converted by the data generation unit 120 into digital ink data capable of being displayed on the display 10.

In addition, the data generation unit 120 may process an overlapped one of the rearrangement strokes reflecting the result of the rearrangement operation, to a stroke block, and generate ink space data between the rearrangement strokes spaced apart at a distance from each other. A more detail description will be provided with reference to FIGS. 7, and 8a to 8d.

Figure 7:
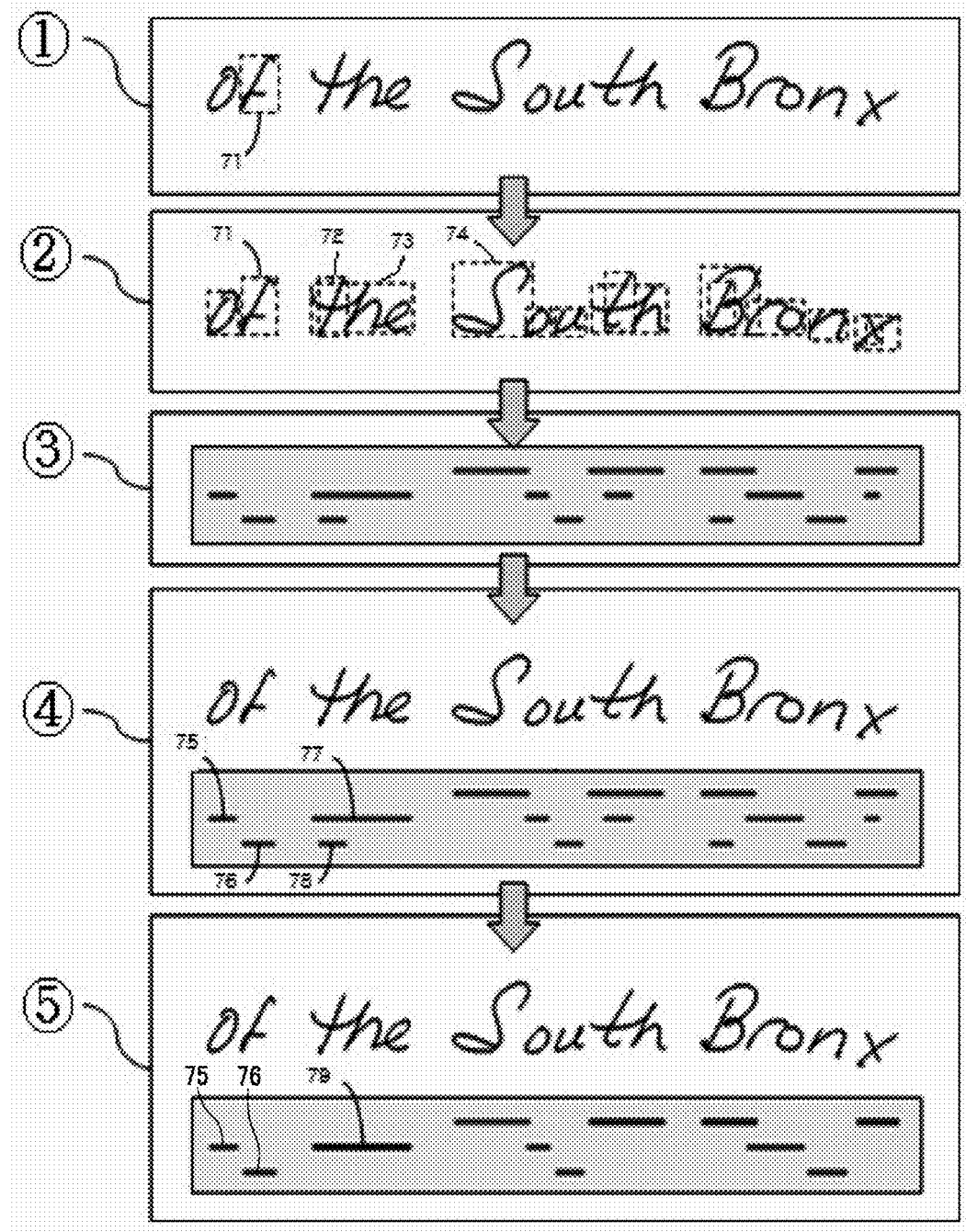
FIG. 7 is a view illustrating a process in which digital ink data is generated by a data generation unit shown in FIG. 2, according to an example.

FIG. 7 is a view illustrating a process in which digital ink data is generated by the data generation unit shown in FIG. 2, according to an example. The data generation unit 120 generates a stroke block and ink space data on the basis of the rearrangement stroke, which is a processing process for displaying the digital ink data on a screen similarly to the text data.

Specifically, the data generation unit 120 may merge the mutually overlapped rearrangement strokes into one stroke block, thereby blocking a cursor to be described below from moving in a stroke unit and from being positioned in an unnatural position. Also, like the text editor editing the text data in character units, the data generation unit 120 processes the digital ink data in block units and thus performs the editing operation in stroke block units instead of in the stroke units.

For example, a combination type character such as Chinese and Korean characters, or "i" and "j" of alphabet include two or more strokes. These characters should be processed as a stroke block, otherwise a cursor for editing is positioned between strokes composing one character and thus the editing is not easy. To solve this problem, the data generation unit 120 processes the rearrangement strokes as one stroke block, and generates the ink space data depending on cases.

More specifically, the data generation unit 120 includes a block processing unit 122 for processing, as one stroke block, rearrangement strokes corresponding to mutually overlapped stroke segments among stroke segments projected onto a virtual x-axis, and generates digital ink data corresponding to the rearrangement stroke or stroke block. In this case, when an overlapped length between mutually overlaid stroke segments among the stroke segments formed by projecting the rearrangement strokes on the virtual x-axis is greater than or equal to a predetermined first reference value, the block processing unit 122 may process the rearrangement strokes corresponding to the mutually overlapped stroke segments, as one stroke block. In addition, the digital ink data corresponding to the rearrangement stroke or stroke block may be generated by the data generation unit 120.

In ① of FIG. 7, it can be seen that alphabet "f" 71 is composed of one stroke. That is, this means that the character "f" 71 has been input at a time.

In ② of FIG. 7, the data generation unit 120 calculates each of stroke regions 71 to 74 for rearrangement strokes that are rearranged by the stroke order rearrangement processing unit 110.

In ③ of FIG. 7, the data generation unit 120 projects the stroke region in a two-dimensional coordinate system onto a one-dimensional coordinate system to convert the stroke region into the stroke segment having only a virtual x-axis value.

In ④ of FIG. 7, there are represented a stroke segment 75 formed by projecting rearrangement stroke of "o" onto the virtual x-axis, a stroke segment 76 formed by projecting rearrangement stroke of "f" onto the virtual x-axis, a stroke segment 77 formed by projecting rearrangement stroke of "-he" onto the virtual x-axis, and a stroke segment 78 formed by projecting rearrangement stroke of "l" onto the virtual x-axis. In this case, the stroke segment 75 and the stroke segment 76 are not overlapped with each other. However, the stroke segment 77 and the stroke segment 78 are overlapped with each other, and the overlapped length is greater than or equal to the predetermined first reference value. The block processing unit 122 of the data generation unit 120 merges and processes a rearrangement stroke of a portion (-) of alphabet "t" and "he" corresponding to the stroke segment 77 with a rearrangement stroke of the other portion (|) of alphabet "t" corresponding to the stroke segment 78, as one stroke block.

In ⑤ of FIG. 7, there is shown a stroke block segment 79 formed by projecting the merged stroke block onto the virtual x-axis. As described above, since the stroke segment 77 and the stroke segment 78 are overlapped over a certain length, the stroke block segment 79 results from merging the two stroke segments 77 and 78. It can be seen that a stroke block segment may result from merging two or more stroke segments, and a stroke block corresponding to the stroke block segment includes two or more rearrangement strokes.

By performing these series of merging process repeatedly, a stroke block allowing an easy editing operation is generated.

Furthermore, FIGS. 8a to 8d are views illustrating a process in which digital ink data is generated by the data generation unit shown in FIG. 2, according to another example.

When the distance between a first stroke segment of stroke segments formed by projecting a rearrangement stroke or stroke block onto the virtual x-axis and a second stroke segment adjacent to the first stroke segment is greater than or equal to a predetermined second reference value, the data generation unit 120 may generate ink space data between a rearrangement stroke or stroke block corresponding to the first stroke segment and a rearrangement stroke or stroke block corresponding to the second stroke segment.

FIG. 8a illustrates a rearrangement stroke reflecting the result of rearranging the stroke input order.

FIG. 8b illustrates the result of selecting overlapped strokes in order to generate a stroke block, and FIG. 8c illustrates the result of merging the overlapped strokes into one stroke block. The overlapped strokes are selected as the stroke block according to the overlapped-stroke selection method.

With reference to FIG. 8a, the mutually-overlapped strokes are 1st, 2nd, 3rd, 10th, 11th, 12th, 13th, 14th, 15th, 18th, 19th, 23rd, 24th, 25th, 26th, 27th, 28th, and 29th rearrangement strokes. According to the overlapped-stroke selection method, stroke segments for first and second rearrangement strokes are merged into a stroke block segment 81' for the stroke block 81, and stroke segments for tenth and eleventh rearrangement strokes are merged into a stroke block segment 82' for the stroke block 82. Likewise, the other stroke segments are merged into stroke block segments 83' to 87', respectively.

FIG. 8d illustrates the result of generating the ink space data. Depending on the predetermined second reference value, an ink space data 88 may be generated or an ink space data 89 may not be generated. The generated ink space data 88 may be determined as independent data, and may be grouped with adjacent digital ink data or text data and handled as one period.

Specifically, the distance between a stroke segment 88a for the fourth rearrangement stroke and a stroke segment 88b for the fifth rearrangement stroke adjacent to the stroke segment 88a is greater than or equal to the predetermined second reference value. Thus, the ink space data 88 may be generated by the data generation unit 120 between the fourth rearrangement stroke of "e" and the fifth rearrangement stroke of "m".

Also, the distance between a stroke segment 89a for the 28th rearrangement stroke and a stroke block segment 89b for the 29th and 30th rearrangement strokes adjacent to the stroke segment 89a is less than the predetermined second reference value. Thus, the ink space data 89 may not be generated by the data generation unit 120 between the 28th rearrangement stroke of "n" and the 29th and 30th stroke block of "x".

Also, the data generation unit 120 may also generate text data corresponding to the input signal generated in the text input mode, which is displayed on the display 10, in addition to the digital ink data. That is, the input signal generated in the text input mode may be converted by the data generation unit 120 into the text data capable of being displayed on the display 10. Specifically, the data generation unit 120 may be implemented on a memory of a storage unit 170 to be described below, using a linked list data structure or an array data structure depending on the application platform, and may generate the digital ink data, ink space data, and text data based on the same data structure format.

The editing unit 130 performs an editing operation on the basis of an editing signal generated for the digital ink data displayed on the screen. Also, the editing unit 130 may perform the editing operation on the basis of editing signals generated for the text data or ink space data displayed on the screen, and the rearrangement processing result. As such, the rearrangement processing is performed by the stroke order rearrangement processing unit 110. However, the editing operation of the editing unit 130 and the rearrangement processing result may have a very close relation.

In this case, the editing signal may include an insertion signal generated by an additional input in the digital ink input mode or text input mode, a deletion signal for deleting the data displayed on the screen, and an update signal generated by the additional input with the data displayed on the screen being selected.

The interface control unit 140 performs control such that a user interface, including the display panel P for displaying at least one of the digital ink data, text data, and ink space data, the input panel 152 supporting the digital ink input mode, and the keyboard 154 supporting the text input mode, may be displayed on the screen of the display 10. Also, the interface control unit 140 delivers an input signal generated by the input panel 152 or keyboard 154 to the stroke order rearrangement processing unit 110 and the data generation unit 120, and delivers the input signal and editing signal to the editing unit 130. In addition, the interface control unit 140 may match the height length 36 of the input panel 152 with the space 37 of the virtual line 156, and may perform control such that the digital ink data may be displayed along the virtual line 156 within the space 37.

Furthermore, the cursor position determination unit 160 shown in FIG. 2 determines the position of the cursor C displayed on the screen. The position of the cursor has a very close relation with the editing unit 130. That is, the editing unit 130 may perform an editing operation on data on the basis of the position of the cursor at the time when the editing signal is generated. In this case, the data may include at least one of the digital ink data displayed on the screen in the digital ink input mode, the text data displayed on the screen and corresponding to the input signal generated in the text input mode, and the ink space data.

Also, the cursor position determination unit 160 may determine the position of the cursor to be in the digital ink data displayed on the screen, between the digital ink data and the text data or ink space data, in the text data displayed on the screen, between the text data and the ink space data, in the ink space data displayed on the screen, or at the end of the most recently generated data.

Figure 9:
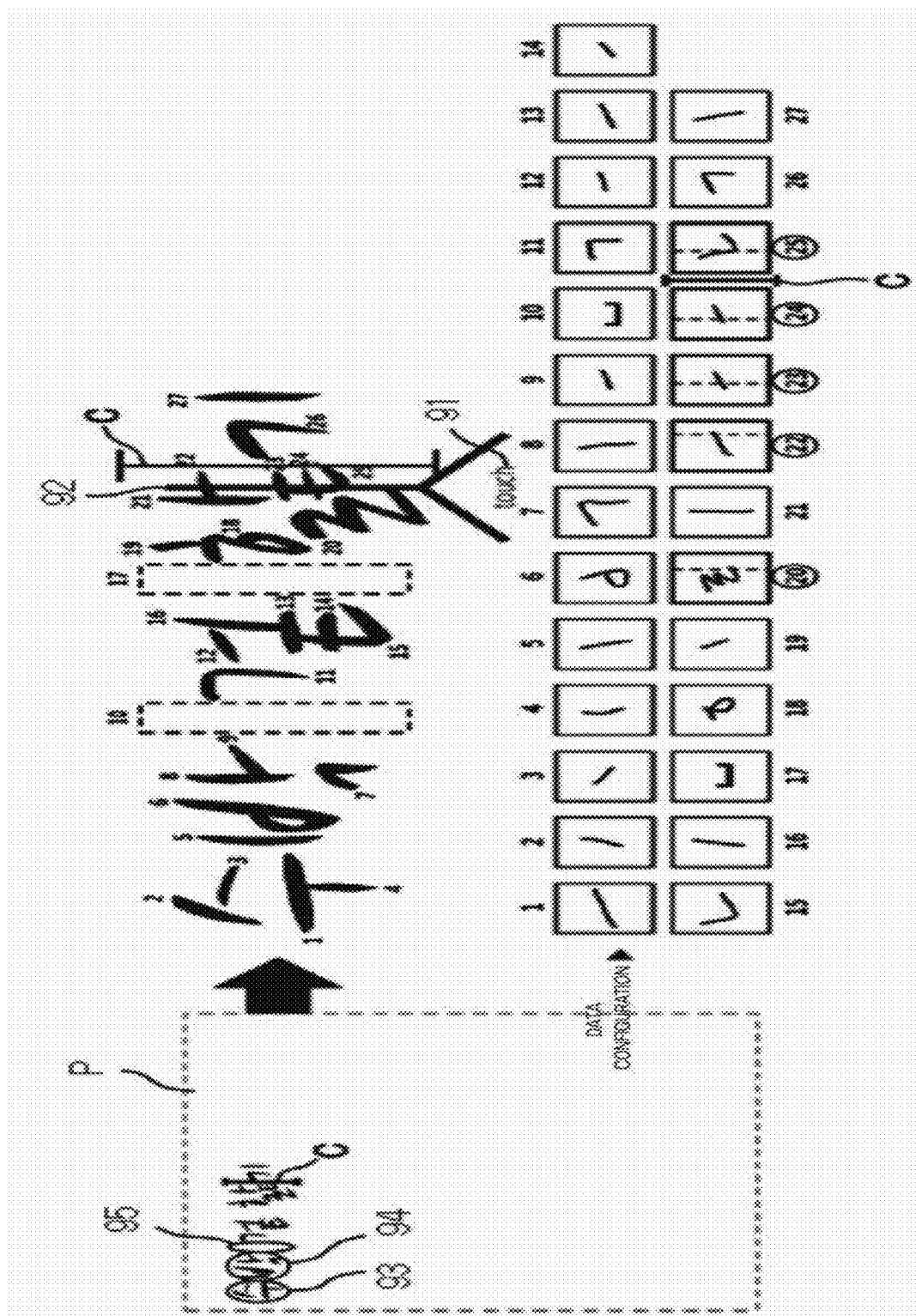
FIGS. 9 and 10 are views illustrating an operation of a cursor position determination unit shown in FIG. 2.
Figure 10:
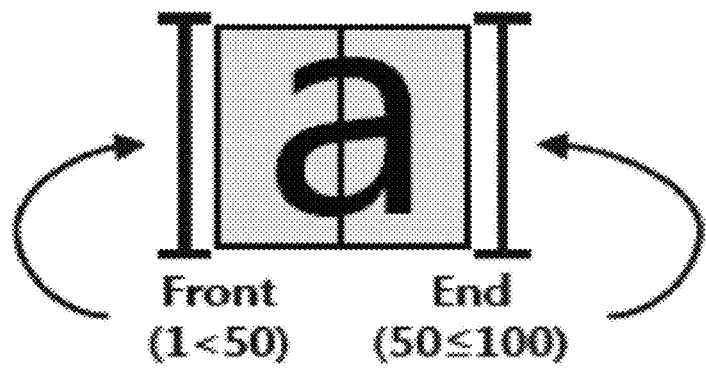

FIGS. 9 and 10 are views illustrating an operation of the cursor position determination unit shown in FIG. 2.

The cursor position determination unit 160 may include a sensing unit 162 and an analysis unit 164, determine the position of the cursor on the basis of the determination result of the sensing unit 162 and the analysis unit 164, and display the cursor on the screen.

The sensing unit 162 detects the position of the touch signal generated by the user touch on the screen. For example, as shown in FIG. 9, when the user presses a specific area in the input panel with his/her finger, the sensing unit 162 may detect a position 91 of the touch signal generated by a touch and deliver the detected position to the analysis unit 164.

The analysis unit 164 forms a virtual axis 92 in the height direction of the screen on the basis of the position 91 of the touch signal, and determines any one of the digital ink data, the text data, and the ink space data which crosses the virtual axis 92, on the basis of the position 91 of the touch signal. For example, as shown in FIG. 9, the digital ink data crossing the virtual axis 92 is digital ink data corresponding to 20th, 22nd, 23rd, 24th, and 25th rearrangement strokes on the basis of the rearrangement processing result, and the analysis unit 164 may analyze which rearrangement stroke the user have selected from among the rearrangement strokes in a variety of methods to determine the position of the cursor C.

For example, the analysis unit 164 may search for the digital ink data corresponding to the rearrangement stroke having the greatest number on the basis of the rearrangement processing result from among the digital ink data crossing the virtual axis 92 and then determine the position of the cursor C to be immediately behind the digital ink data corresponding to 25th rearrangement stroke. In this case, if the position of the touch signal is in a front region of the digital ink data corresponding to 25th rearrangement stroke, the position C of the cursor may be determined to be immediately behind the digital ink data corresponding to the 24th rearrangement stroke, as shown in FIG. 9. The separation of the front or end region may be determined on the basis of 50% of the width length of the specific stroke or rearrangement stroke, as shown in FIG. 10. However, the cursor position determination unit 160 may determine the position of the cursor in another method. The present invention is not limited to the above-described cursor position determination methods.

In order to perform the analysis as shown in FIG. 9, the data generation unit 120 should generate the digital ink data for each of 20th, 22nd, 23rd, 24th, and 25th rearrangement strokes. However, the data generation unit 120 may process a plurality of rearrangement strokes as one stroke block according to the overlapped length between the stroke segments. For example, the data generation unit 120 may group the 23rd, 24th, and 25th rearrangement strokes as one stroke block to generate Korean character of "ㅌ." Also the data generation unit 120 may group 1st to 4th rearrangement strokes to generate Korean syllable of "수" 93, group 5th to 9th rearrangement strokes to generate Korean syllable of "박" 94, and generate separate ink space data 92 for a 10th space. These may be displayed on the display panel P of the screen.

The editing operation of the editing unit 130 may be performed on a variety of data including the digital ink data, the text data, and the ink space data on the basis of the position of the cursor determined through the above method. That is, the editing unit 130 may perform the editing operation on the data displayed on the screen on the basis of the position of the cursor at the time when the editing signal is generated. For example, when the position of the cursor C is determined to be immediately behind the digital ink data corresponding to the 24th rearrangement stroke, a user may generate an editing signal by pressing a backspace button once for generating a deletion signal. The editing unit 130 may delete the digital ink data corresponding to the 24th rearrangement stroke from the screen, and the cursor position determination unit 160 may move the position of the cursor C immediately behind the digital ink data corresponding to the 23rd rearrangement stroke. When the position of the cursor C is determined to be immediately behind the digital ink data corresponding to the 25th rearrangement stroke, a user may generate an editing signal by once pressing a backspace button for generating a deletion signal. In this case, when the data generation unit 120 groups the 23rd, 24th, and 25th rearrangement strokes into one stroke block to generate Korean character of "ㅌ," the editing unit 130 may delete "ㅌ," which is one stroke block corresponding to the 23rd, 24th, and 25th rearrangement strokes, from the screen, and the cursor position determination unit 160 may move the position of the cursor C immediately behind the digital ink data corresponding to the 22nd rearrangement stroke. In addition, the editing unit 130 may change the shade or color of data to be edited on the basis of the position of the cursor C. According to the above example, since the digital ink data corresponding to the 24th rearrangement stroke, or data "ㅌ" is to be edited, the shade or color of the data may vary differently from other data.

Figure 11:
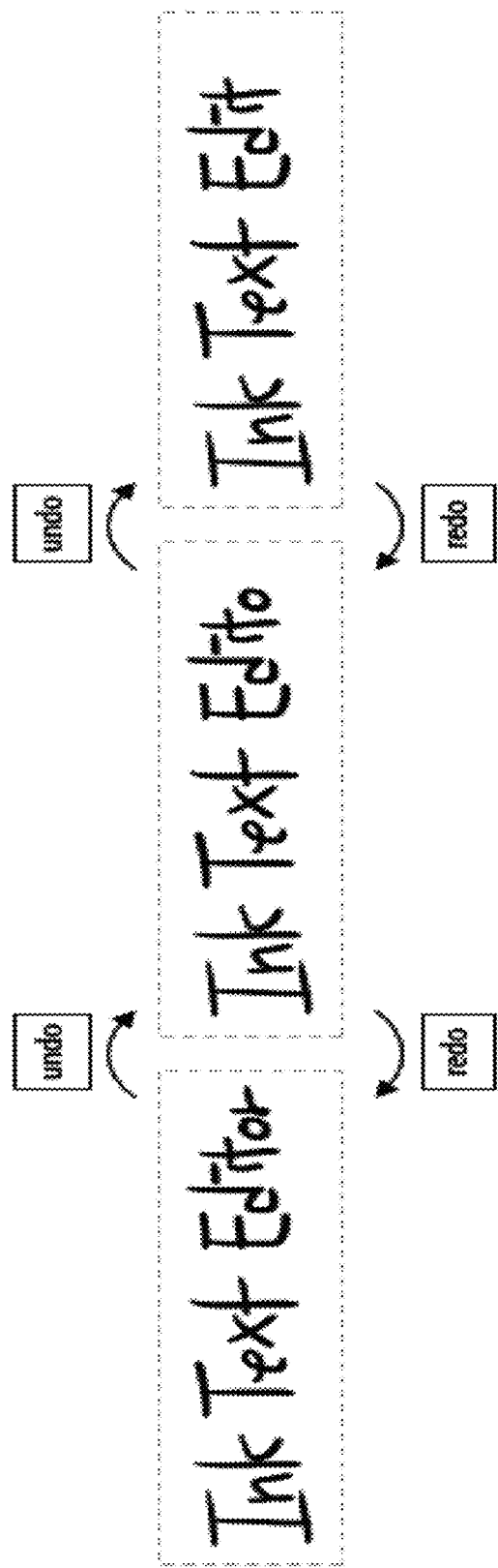
FIGS. 11 and 12 are views illustrating an editing signal generated for data displayed on a screen of a display, and the editing result according to the editing signal.
Figure 12:
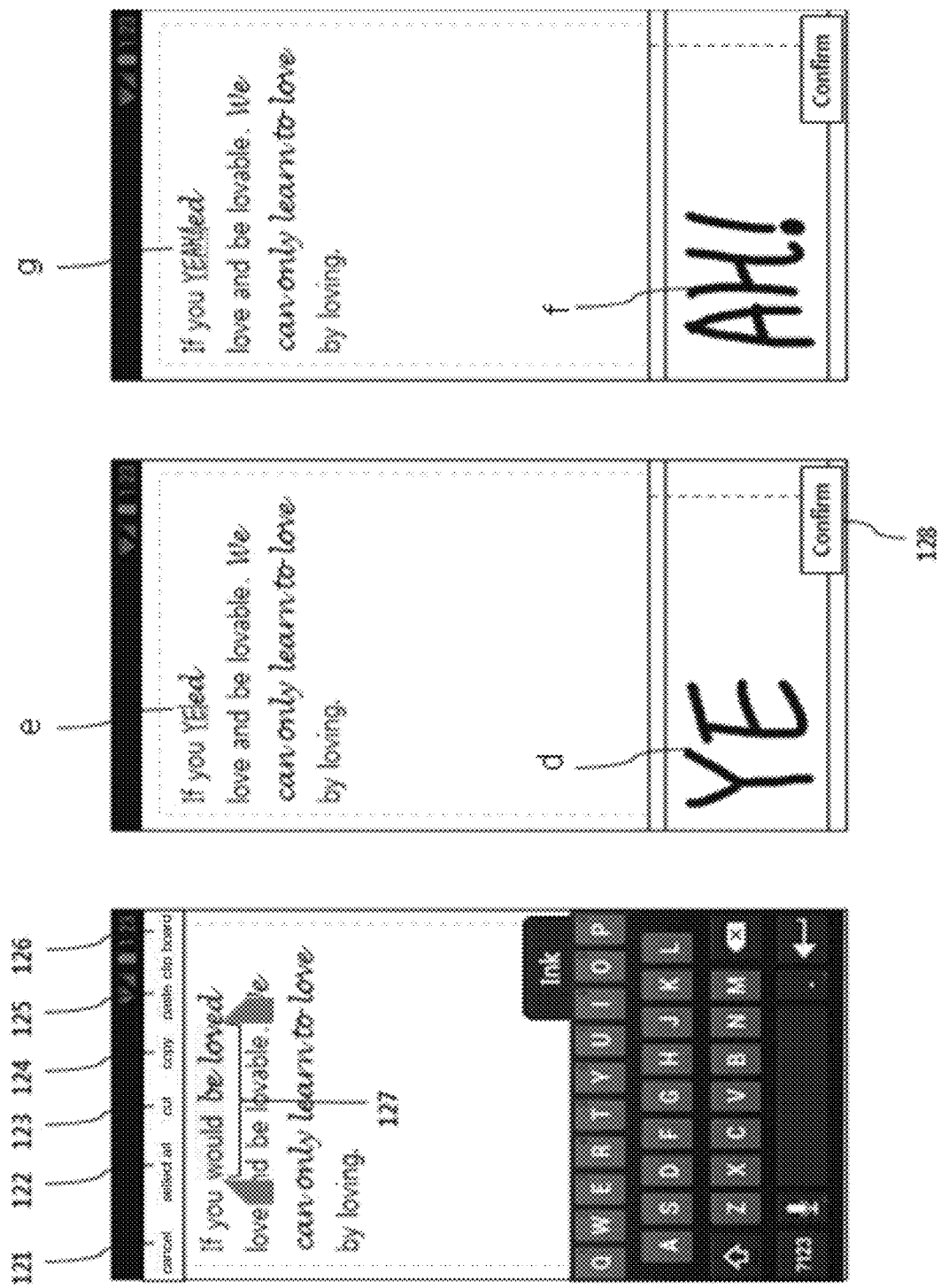

Additionally, FIGS. 11 and 12 are views illustrating an editing signal generated for data displayed on a screen of a display, and the editing result according to the editing signal. FIG. 11 is a view illustrating an editing signal generated when pressing the specific button 46 shown in FIG. 4 and the editing result according to the editing signal. A clear button generates an editing signal for deleting all data including the digital ink data and the text data currently displayed on the screen. An undo button generates an editing signal for deleting data one by one in the display order from the most recently displayed data among data displayed on the screen. A redo button generates an editing signal for recalling data on the contrary to the undo button.

Referring to FIG. 12, the text data, the digital ink data, and the ink space data are sequentially displayed along the virtual line on the display panel. A user desires to edit a part 127 of "would be lov" of the data displayed on the display panel, where "would" is text data, and "be lov" is digital ink data. That is, although the part 127 to be edited is a mixing part of the text data, digital ink data, and ink space data, the editing unit 130 may easily edit the mixing part in the same method. Also, the editing signal required for the editing unit 130 to perform an editing operation may be generated for a certain section including (digital ink/text) data displayed on the screen. In FIG. 12, the part 127 to be edited by the user is grouped into the certain section.

Specifically, the editing signal may include an insertion signal generated by an additional input in the digital ink input mode or text input mode, a deletion signal for deleting the digital ink data or text data displayed on the screen, and an update signal generated by the additional input with the digital ink data or text data displayed on the screen being selected. Also, after each data or certain section displayed on the screen is selected, another type of editing operation may be performed. That is, the other type of editing operation may include a "cancellation" 121 operation, "all selection" 122 operation, "cut" 123 operation, "copy" 124 operation, "paste" 125 operation, "clipboard" 126 operation, etc., and the editing unit 130 may perform an appropriate editing operation on the basis of the selected digital ink data, the text data, and the ink space data, or the editing signal generated in a certain section.

For example, FIG. 12 illustrates the case where the update signal of the editing signal is generated. The section 127 to be edited by a user includes the text data, the digital ink data, and the ink space data. The user may freely edit the data displayed on the screen in the same editing method. With the section 127 being selected, the user may input strokes composing "YE"(d) in the digital ink input mode and confirm that the corresponding digital ink data of "YE"(e) may be displayed instead of data in the section 127. Next, the user may input a stroke composing "AH!"(f) in the digital ink input method and confirm that the corresponding digital ink data "AH!"(g) is displayed along the virtual line immediately behind "YE"(e). The position of the cursor and the shade/color of the focused digital ink data (e, g) may be changed by the editing unit 130 appropriately on the base of the location of the cursor while inputting. In addition, the user may press a confirm button 128, which denotes input completion.

The storage unit 170 shown in FIG. 2 may store the digital ink data, the text data, and the ink space data generated by the data generation unit 120 to have the same data structure format. The storage unit 170 is a kind of memory, and may be implemented as at least one of a non-volatile memory device such as cache, read only memory (ROM), programmable ROM, erasable programmable ROM (EPROM), electrically erasable programmable ROM (EEPROM), and flash memory, a volatile memory device such as random access memory (RAM), and a storage medium such as hard disk drive (HDD), CD-ROM, etc. However, the present invention is not limited thereto.

Also, each element shown in FIG. 2 may be configured as a module. The module denotes a hardware component such as software or field programmable gate array (FPGA) or application specific integrated circuit (ASIC), and performs any role. However, the module is not limited to the software or hardware. The module may be configured to be in an addressable storage medium or to execute one or more processors. The functions provided by the elements and modules may be combined with a smaller number of elements and modules or further divided into additional elements and modules.

As described above, with the data editor proposed by the present invention, a user may freely and intuitively edit the text data, the digital ink data, and the ink space data displayed on the screen. In particular, the user can perform an editing operation on both digital ink data and text data through one user interface and easily generate an editing signal in a familiar method, thereby feeling convenience. Also, the user may also perform an editing operation such as free insertion, deletion, and update on the digital ink data similarly to the text data, thereby being allowed to feel high satisfaction.

Figure 13:
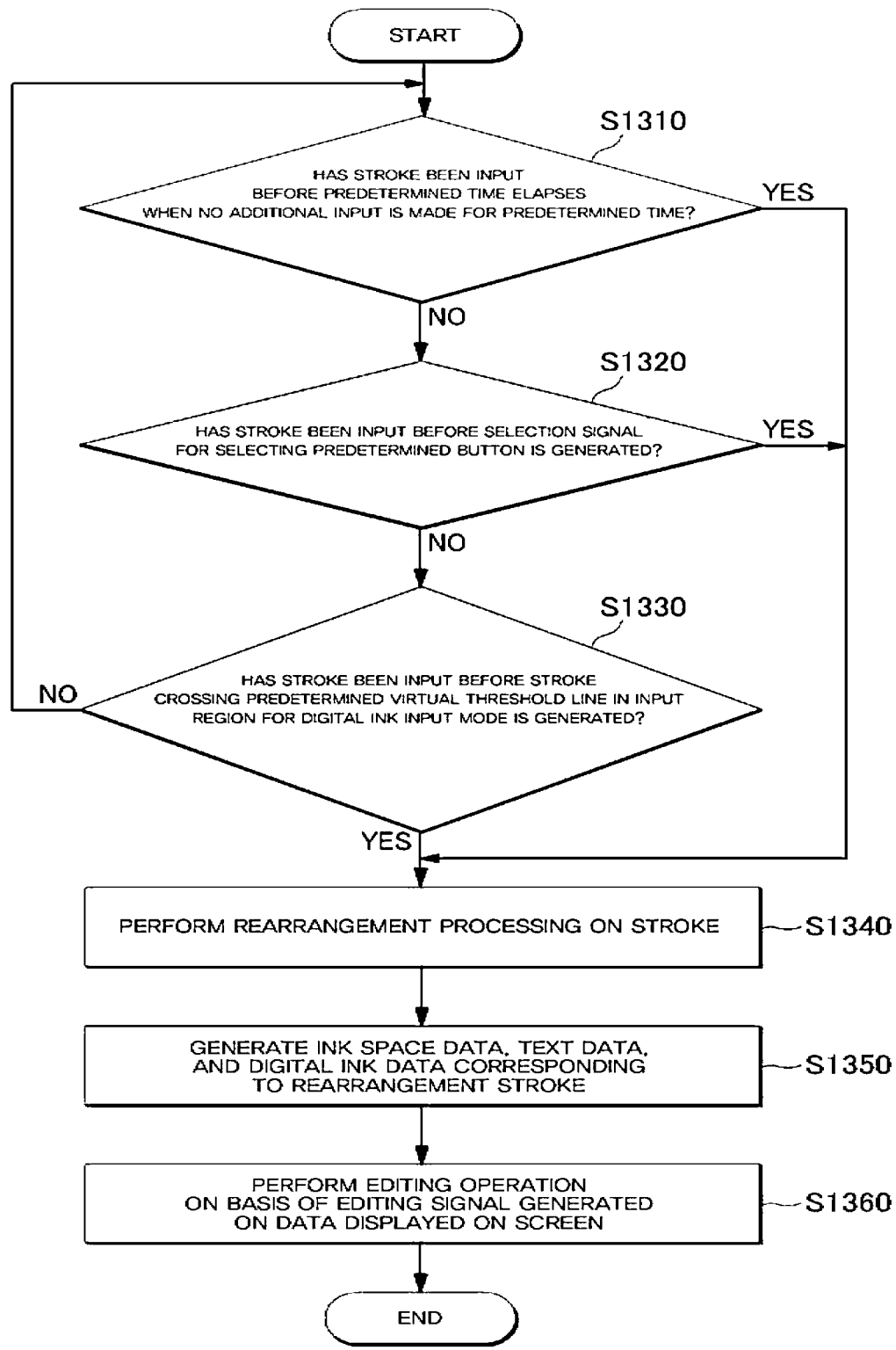
FIG. 13 is a flowchart illustrating a method of editing data according to an embodiment of the present invention.

A method of editing data according to an embodiment of the present invention will be described in detail below with reference to FIG. 13. FIG. 13 is a flowchart illustrating a data editing method according to an embodiment of the present invention, where the data may be digital ink data, text data, or ink space data displayed on the screen of the display. Also, it is desirable that the data editing method proposed by the present invention is performed by, but not limited to, the data editor 100.

First, a stroke input order is rearranged such that one or more strokes input in the digital ink input mode may be processed according to the input position (S1340). The rearrangement processing may be performed on the input signal generated in the text input mode. A detailed description on the rearrangement processing performed in the rearranging operation S1340 will be omitted. However, prior to the rearrangement processing, one or more determination processes may be performed as follows.

Specifically, the first determination is made on whether the input stroke has been input by the predetermined time if there is no additional input for the predetermined time (S1310). For example, the first determination is made on whether the input stroke has been input by 5 seconds if there is no additional input for the predetermined time of 5 seconds.

The second determination is made on whether the input stroke has been input before a selection signal for selecting a predetermined button is generated (S1320). For example, the second determination is made on whether the input stroke has been input before a selection signal for selecting a confirm button is generated.

The third determination is made on whether the input stroke has been input before the input stroke crosses the predetermined virtual threshold line in an input region for the digital ink input mode (S1330). For example, the third determination is made on whether the input stroke has been input before the input stroke crosses the predetermined virtual threshold line 66 around the right end of the input panel 152 as shown in FIG. 6.

The rearrangement processing may be performed on a stroke satisfying at least one of the first, second, and third determinations (S1340). If the stroke does not satisfy the three determinations, the data editor 100 may determine that the input is being made not to perform the rearrangement processing. In addition, the first, second, and third determinations may be made by the stroke order rearrangement processing unit 110 of the data editor 100.

Figure 14:
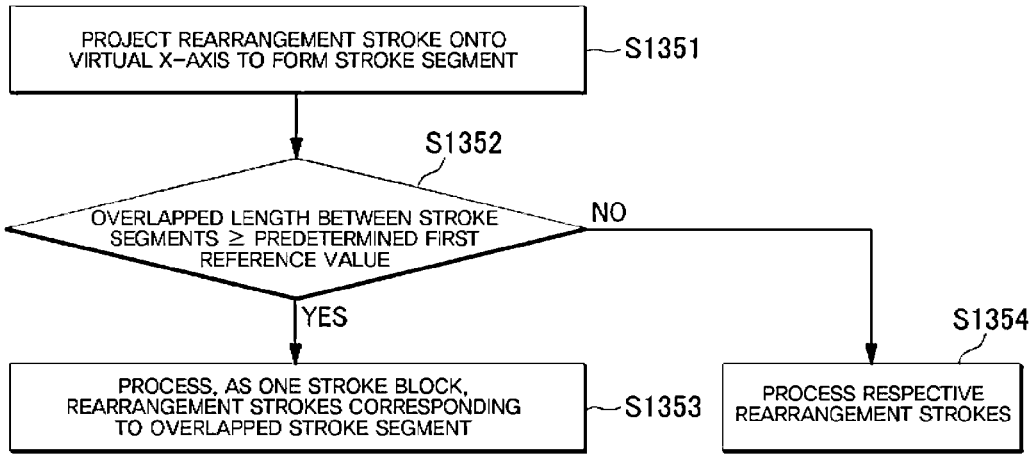
FIGS. 14 and 15 are flowcharts illustrating a process of generating data of FIG. 13.
Figure 15:
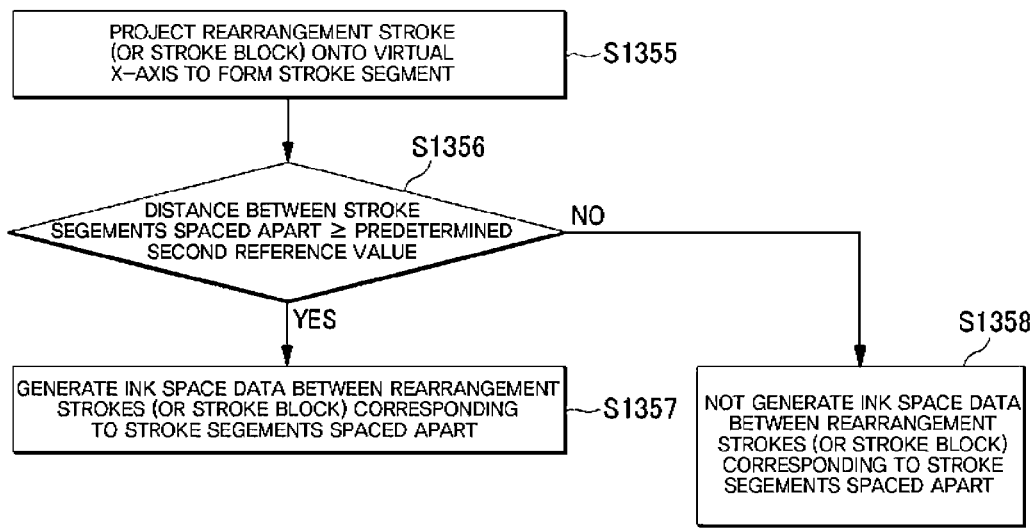

Next, the digital ink data corresponding to the rearrangement stroke and displayed on the screen, the ink space data, and the text data corresponding to the input signal generated in the text input mode are generated (S1350). In this case, processing a plurality of (rearrangement) strokes as a stroke block and generating the ink space data during a process for generating the digital ink data will be described with reference to FIGS. 14 and 15, respectively. FIGS. 14 and 15 are flowcharts illustrating a process of generating data of FIG. 13.

First, processing the plurality of rearrangement strokes as one stroke block will be described with reference to FIG. 14. The data editor 100 projects the rearrangement stroke onto a virtual x-axis to form a stroke segment for the rearrangement stroke (S1351). Next, the data editor 100 compares the overlapped length between mutually overlapped stroke segments among the formed stroke segments with a predetermined first reference value (S1352). If the overlapped length is greater than or equal to the first reference value (Yes), the data editor 100 processes the rearrangement strokes corresponding to the mutually overlapped stroke segments as one stroke block (S1353). Also, if the overlapped length is less than the first reference value (No), the data editor 100 separately processes the rearrangement stroke (S1354). Through such a process, the digital ink data may be generated corresponding to the rearrangement stroke or stroke block.

Next, generating the ink space data will be described with reference to FIG. 15. The data editor 100 compares the distance between a first stroke segment of the stroke segments formed by projecting the rearrangement stroke or stroke block onto a virtual x-axis and a second stroke segment adjacent to the first stroke segment, with a predetermined second reference value (S1355, S1356). If the distance is greater than or equal to the second reference value (YES), the ink space data is generated between the rearrangement stroke or stroke block corresponding to the first stroke segment and the rearrangement stroke or stroke block corresponding to the second stroke segment (S1357). Also, if the overlapped length is less than the second reference value (No), the ink space data is not generated between the rearrangement strokes corresponding to the stroke segments spaced apart (S1358).

Next, the editing operation is performed on the basis of the editing signal generate for a variety of data including the digital ink data, ink space data, and text data displayed on the screen (S1360). The result of the rearrangement operation for rearranging the stroke input order may be stored in the storage unit 170, and this may be utilized in operation S1360.

In addition, the editing operation may be performed on the basis of the editing signal generated for at least one of the digital ink data, ink space data, and text data displayed on the screen. The editing operation may be performed by the editing unit 130 of the data editor 100.

Furthermore, the method of editing data according to another embodiment of the present invention may further include determining the position of the cursor C displayed on the screen. Specifically, operation S1360 may be performed on at least one of the digital ink data displayed on the screen, the text data corresponding to the input signal generated in the text input mode, and the ink space data on the basis of the position of the cursor C at the time when the editing signal is generated.

Specifically, the determining of the position of the cursor includes the following operations. First, the position of the touch signal generated by a user's touch on the screen is detected. Next, any data that crosses a virtual axis formed in the height direction of the screen is determined from among the digital ink data, the text data, and the ink space data on the basis of the position of the touch signal. The position of the cursor is determined on the basis of the determination result.

According to embodiments of the present invention, a user can intuitively and easily perform the editing operation, such as update, deletion, and insertion, on digital ink data displayed on a screen, and thus feel satisfaction.

Also, a user can perform an editing operation on both digital ink data and text data through one user interface and easily generate an editing signal for the digital ink data displayed on a screen in a manner similar to when editing the text data, and thus feel convenience.

As described above, with the data editing method proposed by the present invention, a user may quickly and accurately perform an editing operation on the digital ink data displayed on the screen similarly to the text data. Accordingly, the user may very conveniently and easily edit the ink space data and the text data as well as the digital ink data displayed on the screen.

While the apparatus and method of the present invention are described with reference to specific embodiments, some or all of their elements or operations may be implemented using a computer system having general-purpose hardware architecture.

In addition, an embodiment of the present invention may be implemented as a non-transitory computer-readable medium including instructions executable by a computer such as a program module executed by the computer. The non-transitory computer-readable medium may be any usable medium accessible by a computer, and may include a volatile medium and non-volatile medium, and a discrete medium and integrated medium. Also, the non-transitory computer-readable medium may include both a computer storage medium and a communication medium. The computer storage medium includes the volatile medium and non-volatile medium, and the discrete medium and integrated medium, which are implemented in any method or technology for storing information such as a computer-readable instruction, data structure, program module, or other data. The communication medium typically includes the computer-readable instruction, data structure, program module, and further includes any non-transitory information transmission medium.

It will be understood by those skilled in the art that the above description is illustrative and various changes in form and details may be made therein without departing from the spirit or essential feature of the invention. The above embodiments are accordingly to be regarded as illustrative rather than restrictive. For example, while a single element may be distributed and then carried out, distributed elements may be carried out in a combination thereof.

Therefore, the scope of the invention is defined not by the detailed description of the invention but by the appended claims, and a variety of embodiments within the scope will be construed as being included in the present invention.

What is claimed is:

1. A device for editing digital ink data displayed on a display, the device comprising:
    a stroke order rearrangement processing unit configured to rearrange an input order of two or more strokes on the basis of a predefined criterion to generate a rearranged input order when receiving a user input including the two or more strokes;
    a data generation unit configured to generate digital ink data corresponding to a rearrangement stroke reflecting the rearranged input order; and
    an editing unit configured to change the digital ink data displayed on the display when an editing signal is generated,
    wherein when a distance between two adjacent stroke segments among stroke segments formed by projecting the rearrangement stroke onto a first virtual axis is equal to or greater than a predetermined first reference value, the data generation unit generates ink space data between the rearrangement stroke corresponding to the two stroke segments, and
    the editing unit changes the ink space data when the editing signal is generated.

2. The device of claim 1, wherein the stroke order rearrangement processing unit rearranges the input order of the two or more strokes on the basis of a distance between an input position for the two or more strokes and a virtual reference line predetermined in a region input in a digital ink input mode.

3. The device of claim 1, wherein the two or more strokes are two or more strokes input until a last stroke was input if no additional input has been received for a predetermined time since the last stroke was input, two or more strokes input before a selection signal for selecting a predetermined button is generated, or two or more strokes input before a stroke crossing a virtual threshold line predetermined in a region input in a digital ink input mode is generated.

4. The device of claim 1, wherein the data generation unit generates text data corresponding to an input signal generated by a text input mode, and the editing unit changes the text data displayed on the display when the editing signal is generated.

5. The device of claim 4, wherein the digital ink data and the text data are displayed in a space between a plurality of virtual lines along the plurality of virtual lines.

6. The device of claim 4, wherein the digital ink data and the text data have the same data structure type.

7. The device of claim 1, further comprising a cursor position determination unit configured to determine a position of a cursor displayed on the display,
    wherein the editing unit changes the digital ink data displayed on the display on the basis of the position of the cursor at the time when the editing signal is generated.

8. The device of claim 7, wherein the cursor position determination unit comprises:
    a sensing unit configured to sense a position of a touch signal generated by a user's touch; and
    an analysis unit configured to determine data crossing a virtual axis formed on the basis of the position of the touch signal among the digital ink data, and determines the position of the cursor on the basis of a determination result of the analysis unit.

9. The device of claim 1, wherein the editing signal comprises:
    an insertion signal for inserting additional digital ink data into the digital ink data, a deletion signal for deleting at least a portion of the digital ink data, or an update signal generated when an additional input is applied while the at least a portion of the digital ink data is selected.

10. A method performed by a device for editing digital ink data displayed on a display, the method comprising:

rearranging, by a stroke order rearrangement processing unit, an input order of two or more strokes on the basis of a predefined criterion to generate a rearranged input order when receiving a user input including the two or more strokes from a input unit;

generating, by a data generation unit, digital ink data corresponding to a rearrangement stroke reflecting the rearranged input order; and changing, by an editing unit, the digital ink data displayed on the display when an editing signal is generated, wherein when a distance between two adjacent stroke segments among stroke segments formed by projecting the rearrangement stroke onto a first virtual axis is equal to or greater than a predetermined first reference value, the generating of the digital ink data comprises generating ink space data between the rearrangement stroke corresponding to the two stroke segments, and the editing comprises changing the ink space data when the editing signal is generated.

11. The method of claim 10, wherein the generating of the rearranged input order comprises rearranging the input order of the two or more strokes on the basis of a distance between an input position for the two or more strokes and a virtual reference line predetermined in a region input in a digital ink input mode.

12. The method of claim 10, wherein the two or more strokes are two or more strokes input until a last stroke was input if no additional input has been received for a predetermined time since the last stroke was input, two or more strokes input before a selection signal for selecting a predetermined button is generated, or two or more strokes input before a stroke crossing a virtual threshold line predetermined in a region input in a digital ink input mode is generated.

13. A device for editing digital ink data displayed on a display, the device comprising:

a stroke order rearrangement processing unit configured to rearrange an input order of two or more strokes on the basis of a predefined criterion to generate a rearranged input order when receiving a user input including the two or more strokes;

a data generation unit configured to generate digital ink data corresponding to a rearrangement stroke reflecting the rearranged input order; and an editing unit configured to change the digital ink data displayed on the display when an editing signal is generated, wherein when an overlapped length between overlapped stroke segments among stroke segments formed by projecting the rearrangement stroke onto a first virtual axis is equal to or greater than a predetermined first reference value, the data generation unit comprises a block processing unit configured to process, as one stroke block, a plurality of strokes corresponding to the overlapped stroke segments, and generates digital ink data corresponding to the stroke block, and wherein when a distance between two adjacent stroke segments among stroke segments formed by projecting the stroke block onto the first virtual axis is equal to or greater than a predetermined second reference value, the data generation unit generates ink space data between the stroke block corresponding to the two stroke segments, and the editing unit changes the ink space data displayed on the display when the editing signal is generated.

14. A method performed by a device for editing digital ink data displayed on a display, the method comprising:

rearranging, by a stroke order rearrangement processing unit, an input order of two or more strokes on the basis of a predefined criterion to generate a rearranged input order when receiving a user input including the two or more strokes from a input unit;

generating, by a data generation unit, digital ink data corresponding to a rearrangement stroke reflecting the rearranged input order; and changing, by an editing unit, the digital ink data displayed on the display when an editing signal is generated, wherein when an overlapped length between overlapped stroke segments among stroke segments formed by projecting the rearrangement stroke onto a first virtual axis is greater than a predetermined first reference value, the generating of the digital ink data comprises processing, as one stroke block, a plurality of strokes corresponding to the overlapped stroke segments and generating digital ink data corresponding to the stroke block, and wherein when a distance between two adjacent stroke segments among stroke segments formed by projecting the stroke block onto the first virtual axis is equal to or greater than a predetermined second reference value, the generating comprises generating ink space data between the stroke block corresponding to the two stroke segments, and the editing comprises changing the ink space data displayed on the display when the editing signal is generated.

* * * * *